(12) United States Patent
Uehara et al.

(10) Patent No.: US 8,059,875 B2
(45) Date of Patent: Nov. 15, 2011

(54) INFORMATION PROCESSOR, METHOD OF DETECTING FACTOR INFLUENCING HEALTH, AND PROGRAM

(75) Inventors: Sayuri Uehara, Yokohama (JP); Yasuyuki Oki, Yokohama (JP); Masaki Hirayama, Kawasaki (JP)

(73) Assignee: Hitachi Consulting Co., Ltd., Tokyo (JP)

( * ) Notice: Subject to any disclaimer, the term of this patent is extended or adjusted under 35 U.S.C. 154(b) by 1040 days.

(21) Appl. No.: 11/937,667

(22) Filed: Nov. 9, 2007

(65) Prior Publication Data

US 2011/0002512 A1 Jan. 6, 2011

(30) Foreign Application Priority Data

Nov. 10, 2006 (JP) ................. 2006-305850

(51) Int. Cl.
 *G06K 9/00* (2006.01)
(52) U.S. Cl. ...................... 382/128; 382/100
(58) Field of Classification Search .................. 382/128, 382/100
 See application file for complete search history.

(56) References Cited

U.S. PATENT DOCUMENTS

| | | | |
|---|---|---|---|
| 6,023,520 A | | 2/2000 | Nagasaka et al. |
| 6,192,183 B1* | | 2/2001 | Taniguchi et al. ............ 386/282 |
| 6,766,057 B2* | | 7/2004 | Miyatake et al. ............ 382/190 |
| 6,937,764 B2 | | 8/2005 | Sakamoto |
| 7,254,311 B2* | | 8/2007 | Nagasaka et al. ............ 386/241 |
| 7,319,780 B2* | | 1/2008 | Fedorovskaya et al. ...... 382/128 |
| 2003/0061612 A1 | | 3/2003 | Soo et al. |
| 2008/0292212 A1* | | 11/2008 | Ozaki .......................... 382/284 |

FOREIGN PATENT DOCUMENTS

| | | |
|---|---|---|
| EP | 810 794 | 12/1997 |
| EP | 961 275 | 12/1999 |
| WO | WO2006/022289 | 3/2006 |

* cited by examiner

*Primary Examiner* — Andrew W Johns
*Assistant Examiner* — Shefali Goradia
(74) *Attorney, Agent, or Firm* — Mattingly & Malur, PC

(57) ABSTRACT

Provided is an information processor which detects factors, in a video, influencing health, and which includes: an image input unit which receives a series of image data to process a plurality of consecutive still images constituting the video; a feature-quantity calculation unit which calculates a feature quantity of each still images on the basis of the image data; a conditional-expression storing unit which stores a conditional expression, for each factor, to determine whether each of the still images produces the factor on the basis of the corresponding feature quantity; a factor determination unit which determines, for each factor, whether each of the still images produces the factors on the basis of the corresponding feature quantity and the corresponding conditional expression; and an image-list display unit which displays, for each factor, a list of information indicating the still images determined to produce the factor.

5 Claims, 15 Drawing Sheets

151

| | FRAME TIME | STILL-IMAGE DATA | FEATURE QUANTITY 1 | FEATURE QUANTITY 2 | FEATURE QUANTITY 3 | FEATURE QUANTITY 4 |
|---|---|---|---|---|---|---|
| $L_1[1]$ | 00:00:10:08 | ... | 192 | 1465 | 0.5, 0.7, ... | 64, 124, ... |
| $L_1[2]$ | 00:00:10:09 | ... | 68 | ... | ... | ... |
| $L_1[3]$ | 00:00:10:10 | ... | 214 | ... | ... | ... |

INFORMATION PROCESSOR, METHOD OF DETECTING FACTOR INFLUENCING HEALTH, AND PROGRAM

CROSS-REFERENCE TO RELATED APPLICATIONS

The present application claims a priority from Japanese Patent Application No. 2006-305850 filed on Nov. 10, 2006, the content of which herein incorporated by reference.

BACKGROUND OF THE INVENTION

1. Field of the Invention

The present invention relates to an information processor, and a method and a program of detecting a factor influencing health.

2. Related Art

It is known that flickering light and a rapid change in brightness as seen on videos of television or the like have an influence on health. Against this influence, proposed is a mechanism to display an image which produces such a factor influencing health. See, for example, U.S. Pat. No. 6,937,764 and U.S. Pat. No. 7,184,593.

When a list of images producing the factor influencing health is displayed, nevertheless, it may be difficult to grasp what kind of problem exists in the images thus displayed. Moreover, it may be difficult to determine how to edit the images only on the basis of the displayed list of images.

SUMMARY OF THE INVENTION

The present invention has been made in view of the above background. An object of the present invention is to provide: an information processor to display an image which produces a factor influencing health in a manner that a user is allowed to easily grasp what kind of factor is produced by the image; a method of detecting a factor influencing health; and a program therefor.

To solve the above-described and other related problems, one aspect of the present invention is an information processor which detects factors, in a video, influencing health. The information processor includes: an image input unit which receives a series of image data to process a plurality of consecutive still images constituting the video; a feature-quantity calculation unit which calculates a feature quantity of each of the still images on the basis of the image data; a conditional-expression storing unit which stores a conditional expression, for each factor, to determine whether each of the still images produces the factor on the basis of the corresponding feature quantity; a factor determination unit which determines, for each factor, whether each of the still images produces the factor on the basis of the corresponding feature quantity and the corresponding conditional expression; and an image-list display unit which displays, for each factor, a list of information indicating the still images determined to produce the factor.

According to the information processor in one aspect of the present invention, it is possible to display, for each factor, a series of still images determined to produce the factors. Thereby, it is possible to easily grasp what factor the displayed still image produces.

The information processor in one aspect of the present invention can further include: an image-storing unit which stores the image data while associating the image data with a time elapsed after the video starts being displayed; and a group-creation unit which groups, for each factor, consecutive pieces of information indicating the still images determined to produce the factor so that a difference between the elapsed times of the consecutive pieces can be equal to or less than a predetermined threshold. The image-list display unit displays, for each factor, a list of information indicating the still images which belong to each of the groups.

The information processor in one aspect of the present invention can further include an image-storing unit which stores the series of image data received by the image input unit. The feature quantity is brightness information indicating the brightness of each of the still images. The conditional expression can be to determine whether the degree of difference in the brightness information between the consecutive still images exceeds a predetermined threshold.

The information processor in one aspect of the present invention can further include an image-storing unit which stores the series of image data received by the image input unit. The feature quantity can be divided feature information obtained by using feature quantities of divided images, the divided images obtained by dividing each of the still images in a grid-form. The conditional expression can be to determine whether the number of particular divided images among the divided images exceeds a predetermined threshold, the particular divided images each having the divided feature information that has a difference from that of the corresponding divided image of each of the consecutive still images, the difference exceeding a predetermined threshold.

In the information processor in one aspect of the present invention, the feature quantity can be spatial-frequency distribution information on each of the still images. The conditional expression can be to determine whether the degree of difference between the spatial-frequency distribution information and predetermined spatial-frequency distribution information exceeds a predetermined threshold.

The information processor in one aspect of the present invention can further include an image storing unit which stores the image data received by the image input unit while associating the image data with a time elapsed after the video starts being displayed. The feature quantity can be color distribution information indicating, color distribution information of each-color information indicating each color of a pixel forming the still images, the color distribution information indicating the number of pixels of each color appearing in each of the still images. The feature-quantity calculation unit can determine whether the degree of difference between the color distribution information on each of the still images and predetermined color distribution information exceeds a first predetermined threshold. The conditional expression can be to determine whether the difference in the elapsed time between the consecutive still images in order of the elapsed time exceeds a second predetermined threshold, the consecutive still images having the degrees of difference exceeding the first predetermined threshold.

The information processor in one aspect of the present invention can further include: a list-storing unit which stores a list of information, for each factor, indicating the still images determined to produce the factors; and a list-adjustment unit which deletes, from the list for each factor, each piece of the information indicating the still images in the list, in a case where a difference between the feature quantity of the still image indicated by the piece of the information and that indicated by a certain piece of the information is equal to or less than a predetermined threshold, the certain piece of the information preceding the piece of the information by a predetermined number of pieces of information. The image-list display unit displays, for each factor, a list of information indicating the still images in the list for the factor.

The information processor in one aspect of the present invention can further include: a list-storing unit which stores a list of information, for each factor, indicating the still images determined to produce the factor; and a list-adjustment unit which deletes, from the list for each factor, each piece of the information indicating the still images in the list, in a case where the piece of the information is also included in the list for one of the other factors. The image-list display unit can display, for each factor, a list of information indicating the still images in the list for the factor. The information processor can further include a priority-storing unit which stores a priority for each of the factors. The list-adjustment unit which deletes, from the list for each factor, each piece of the information indicating the still images in the list, in a case where the piece of the information is also included in the list for anyone of the other factors that has the higher priority than the factor.

In the information processor in one aspect of the present invention, the piece of the information indicating the still image can be a thumbnail image, which is created on the basis of the image data, and which is the still image reduced in size.

The information processor in one aspect of the present invention can further include: a list-storing unit which stores a list of information, for each factor, indicating the still images determined to produce the factor; a computing unit which performs a computing on the basis of the number of pieces of information in the list for each factor; and a computing-result display unit displays a result of the computing.

Other problems and a method of solving the problems disclosed in the present application will be apparent from the section of detailed description of the invention and the accompanying drawings.

According to the present invention, it is possible to display an image which produces a factor influencing health, so that a user is allowed to easily grasp what factor the image produces.

BRIEF DESCRIPTION OF THE DRAWINGS

FIG. 3 shows a configuration example of a factor-image storing unit 151;

DETAILED DESCRIPTION OF THE INVENTION

Description will be given below of a factor detection apparatus 10 according to an embodiment of the present invention. The factor detection apparatus 10 according to this embodiment detects an image, in a video, producing a factor influencing health (hereinafter referred to as a factor image) on the basis of a feature quantity of a still image captured from the video.

As the factor influencing health, this embodiment employs four factors: a flicker of screen; a display of a regularly patterned design such as a striped design, a spiral design and a concentric design; a display of a short-duration scene (a so-called subliminal video); and an inversion of contrast. Although described later, the factor images are organized in the factors, and thereby it is possible to easily grasp what factor the factor image produces.

==Hardware Configuration==

Figure 1:
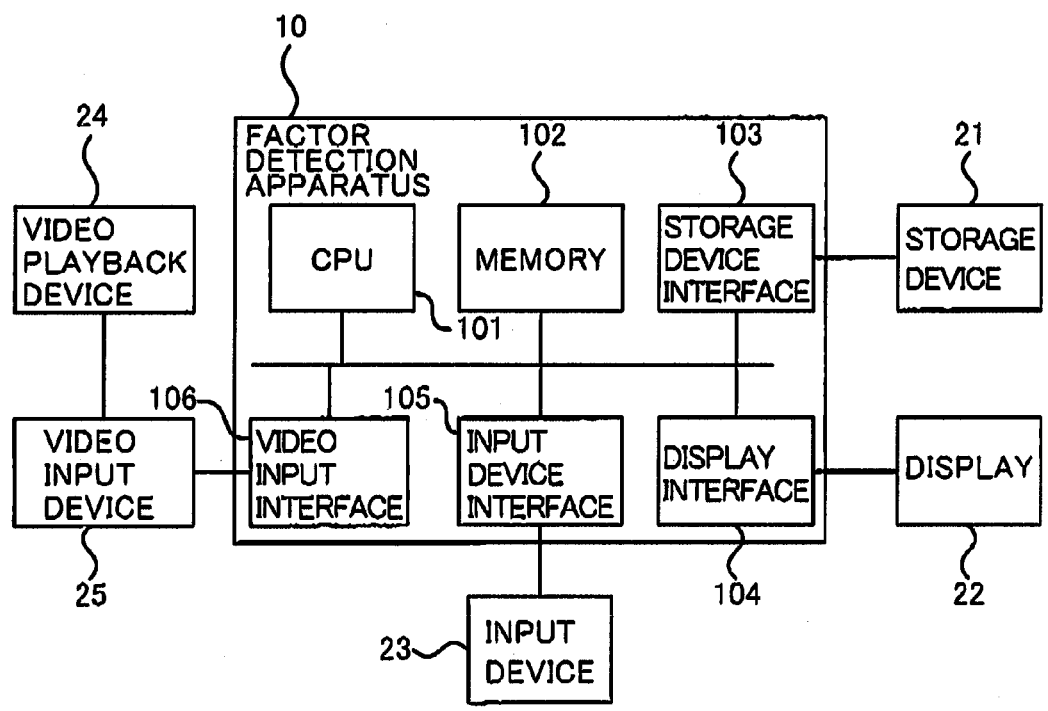
FIG. 1 shows a hardware configuration of a factor detection apparatus 10 according to the present embodiment.

FIG. 1 shows a hardware configuration of the factor detection apparatus 10 according to this embodiment. As shown in this diagram, the factor detection apparatus 10 according to this embodiment includes a CPU 101, a memory 102, a storage device interface 103, a display interface 104, an input device interface 105 and a video input interface 106. The factor detection apparatus 10 is connected to a storage device 21, a display 22, an input device 23, a video playback device 24 and a video input device 25.

The storage device 21 stores programs or data, and the example includes a hard disc drive, a CD-ROM drive and a flash memory. The storage device interface 103 is an interface to connect the factor detection apparatus 10 to the storage device 21. The CPU 101 implements various functions by executing the programs stored in the storage device 21, after reading the programs into the memory 102 through the storage device interface 103.

The display interface 104 is an interface to connect the factor detection apparatus 10 to the display 22 which displays various information. The input device interface 105 is an interface to connect the factor detection apparatus 10 to the input device 23 such as a keyboard and a mouse.

The video playback device 24 reproduces a video signal recorded in a recording medium such as an optical disc and a video tape. Note that, the video playback device 24 may output radio waves, as a video signal, which have been broadcast for terrestrial broadcasting and satellite broadcasting. Alternatively, the video playback device 24 may output a video signal obtained by decoding a signal being broadcast for a cable television.

The video input device 25 is, for example, a capture board which captures the video signals, per frame, outputted from the video playback device 24, and then which outputs the captured still images as data (hereinafter referred to as still-image data). The still-image data outputted from the video input device 25 is accompanied by information on a time elapsed after the image begins to be captured by the video input device 25 (hereinafter referred to as a frame time).

The video input interface 106 is an interface to connect the factor detection apparatus 10 to the video input device 25. The factor detection apparatus 10 stores, into the memory 102, the still-image data outputted from the video input device 25 through the video input interface 106. Then, the factor detection apparatus 10 determines whether or not the stored still image is the factor influencing health on the basis of the feature quantity of the stored still image in the video, as will be described later.

Incidentally, the frame time may be calculated on the basis of the time when the still-image data get read into the memory 102 through the video input interface 106.

==Software Configuration==

Figure 2:
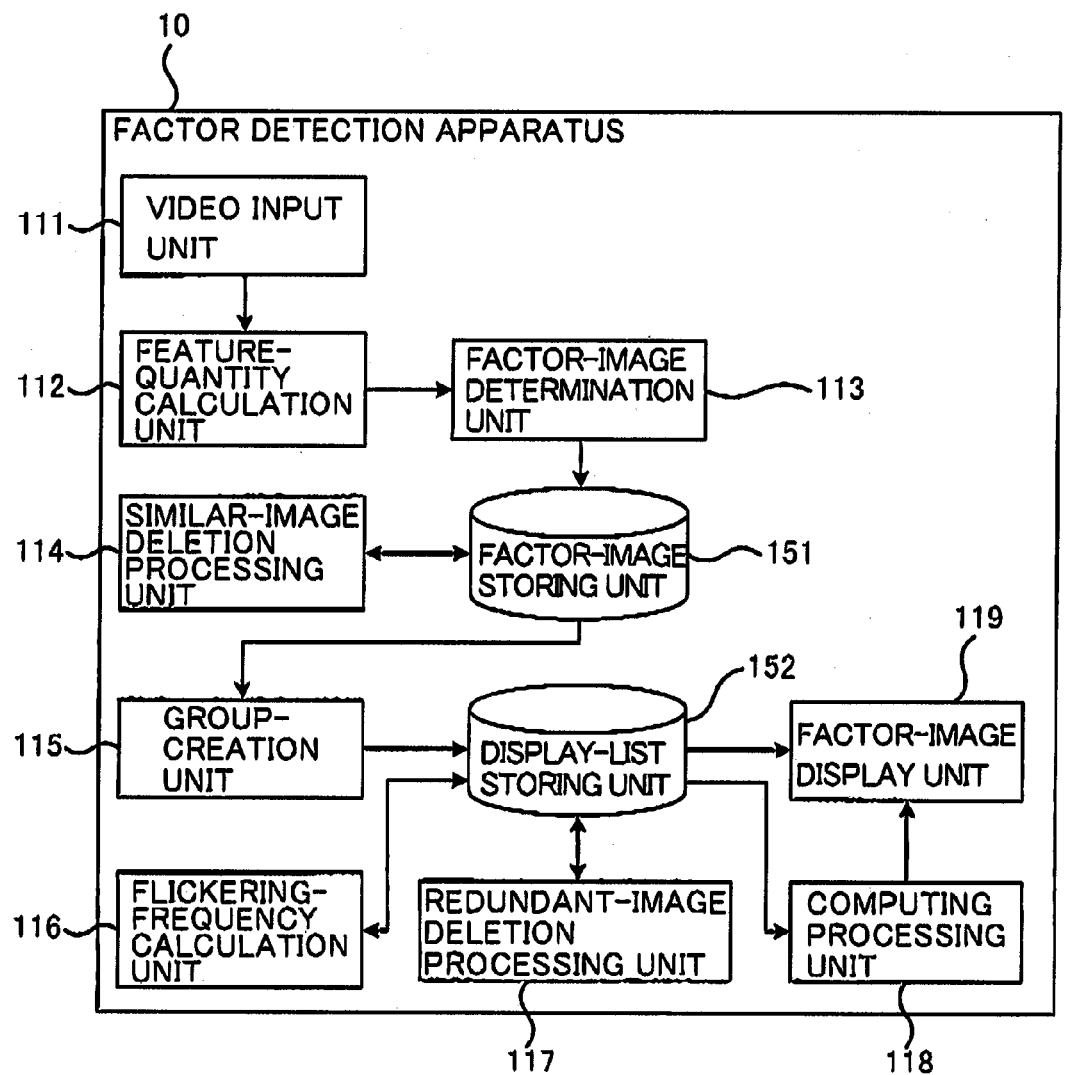
FIG. 2 shows a software configuration of the factor detection apparatus 10.

FIG. 2 shows a software configuration of the factor detection apparatus 10. As shown in this diagram, the factor detection apparatus 10 includes a video input unit 111, a feature-quantity calculation unit 112, a factor-image determination unit 113, a similar-image deletion processing unit 114, a group-creation unit 115, a flickering-frequency calculation unit 116, a redundant-image deletion processing unit 117, a computing processing unit 118, a factor-image display unit 119, a factor-image storing unit 151 and a display-list storing unit 152. Note that, the video input unit 111, the feature-quantity calculation unit 112, the factor-image determination unit 113, the similar-image deletion processing unit 114, the group-creation unit 115, the flickering-frequency calculation unit 116, the redundant-image deletion processing unit 117, the computing processing unit 118 and the factor-image display unit 119 implements the respective functions, when the CPU 101 of the factor detection apparatus 10 executes the programs after reading, into the memory 102, the programs which have been stored in the storage device 21, through the storage device interface 103. Additionally, the factor-image storing unit 151 and the display-list storing unit 152 implement the respective functions as the storage areas provided by the memory 102 and the storage device 21.

The video input unit 111 receives the still-image data and the frame time outputted from the video input device 25.

The factor-image storing unit 151 stores information on a factor image (hereinafter referred to as frame information) for each factor. FIG. 3 shows a configuration example of the factor-image storing unit 151. As shown in this diagram, the factor-image storing unit 151 stores the factor images as lists L1 to L4 for the above-described corresponding factors, respectively. Additionally, the frame information stored in each list includes the frame time, still-image data and feature quantities 1 to 4 as shown in FIG. 3.

The feature-quantity calculation unit 112 calculates the feature quantity of the still image on the basis of the still-image data received by the video input unit 111. In this embodiment, the feature-quantity calculation unit 112 calculates the following four feature quantities 1 to 4.

The feature quantity 1 is an average brightness of a still image. The feature quantity 1 is used to detect a flicker of video.

The feature quantity 2 is a distribution of spatial frequency in a still image (hereinafter referred to as spatial-frequency distribution information). The feature quantity 2 is calculated by performing a two-dimensional Fourier transform on still-image data. The feature quantity 2 is used to detect a regularly patterned design.

The feature quantity 3 is a frequency distribution (hereinafter referred to as color distribution information) of data values (pixel values) respectively indicating pixels in a still image, the data constituting the still-image data. The feature quantity 3 is used to detect a so-called subliminal video which is displayed only for a short-duration.

The feature quantity 4 (corresponding to divided feature information according to the present invention) is a distribution of the average brightness for each block which is obtained by dividing a still image into grid-form blocks. The feature quantity 4 is used to detect an inversion of contrast. Incidentally, as the feature quantity 4, the spatial frequency information, color distribution information or the like can be used instead of the average brightness.

The factor-image determination unit 113 determines whether or not the inputted still-image data is to display a factor image on the basis of the feature quantities calculated by the feature-quantity calculation unit 112. The factor-image determination unit 113 performs the determination for the above-described four factors on the basis of predetermined conditions 1 to 4, respectively.

With respect to the flicker of video, the factor-image determination unit 113 calculates the difference (average brightness difference) between the average brightness (feature quantity 1) of still-image data Fi and that of still-image data Fi−1. The still-image data Fi is the i th data received by the video input unit 111. Likewise, the still-image data Fi−1 is the i−1 th data received by the video input unit 111. Subsequently, the factor-image determination unit 113 determines, as the condition 1, whether or not the calculated average brightness difference exceeds a predetermined threshold.

With respect to the regularly patterned design, the factor-image determination unit 113 calculates the difference (degree of difference) between the number of appearance of the regularly patterned design in Fi and that in Fi−1 for each predetermined spatial frequency. Subsequently, the factor-image determination unit 113 determines, as the condition 2, whether or not the calculated degree of difference exceeds a predetermined threshold.

With respect to the subliminal video, the factor-image determination unit 113 calculates the difference between the number of appearance of the subliminal video in Fi and that in Fi−1 for each predetermined pixel value. Subsequently, the factor-image determination unit 113 determines, as the condition 3, whether or not the calculated degree of difference exceeds a predetermined threshold.

With respect to the inversion of contrast, the factor-image determination unit 113 calculates the brightness difference between the average brightness of Fi and that of Fi−1 for each predetermined block obtained by dividing a still image. Subsequently, the factor-image determination unit 113 counts the number of blocks in which the calculated brightness difference exceeds a first predetermined threshold, and determines, as the condition 4, whether or not the counted number exceeds a second predetermined threshold.

Note that the conditions 1 to 4 are stored in, for example, the memory 102 and the storage device 21 (condition storing units). As the method of implementing the functions of the condition storing units, the conditions may be incorporated, as a program code, into a process to be described below.

When any condition described above is satisfied, the frame information including the inputted still-image data, frame time and the feature quantities 1 to 4 is registered in the list of the factor-image storing unit 151.

The similar-image deletion processing unit 114 deletes, from the list, the frame information on the still image which has a frame time approximate to those of the consecutive still images, and concurrently which slightly differs from the consecutive still images in the feature quantity.

Figure 4:
FIG. 4 shows a configuration example of display lists stored in a display-list storing unit 152.

The display-list storing unit 152 stores display lists L'1 to L'4. FIG. 4 shows a configuration example of the display lists stored in the display-list storing unit 152. As shown in this diagram, the display lists L'1 to L'4 stores an image-flickering interval flag, the flickering frequency and a group number in addition to the above-described frame information. Note that, hereinbelow, the information stored in the display lists is also referred to as frame information. The image-flickering interval flag and the flickering frequency are information relating to the number of flickers in video per second.

The group-creation unit 115 groups pieces of frame information which slightly differ from one another in frame time for each list stored in the factor-image storing unit 151 to create the display lists L'1 to L'4. In this embodiment, with respect to the lists L2 and L3, the group-creation unit 115 registers, into L'2 and L'3, the frame information obtained by adding, to every piece of the frame information registered in the respective lists L2 and L3, the image-flickering interval flag "OFF", the flickering frequency "0" and the group number "1". The specifics of the creation process of L'1 and L'4 by the group-creation unit 115 will be described later.

Figure 5:
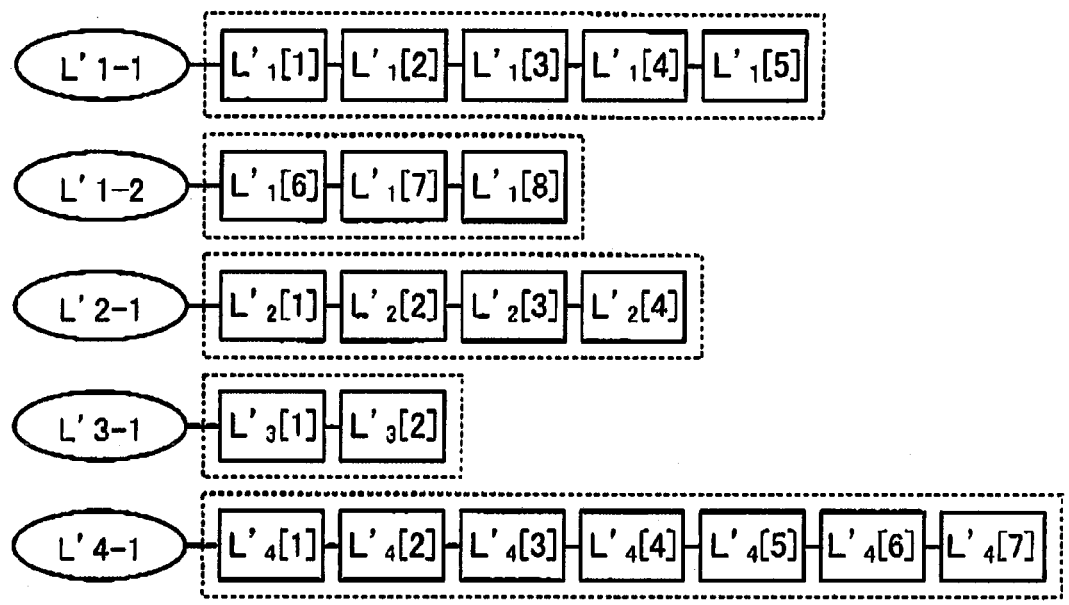
FIG. 5 illustrates a structure of grouped frame information.

FIG. 5 illustrates a structure of the grouped frame information. In the example shown in this diagram, the pieces of frame information are grouped corresponding to the oval figures in each of which the display list and the group number are connected with hyphenation. In this way, the frame information is organized in each factor and group number in this embodiment.

The flickering-frequency calculation unit 116 calculates the number of still images in the flickering portion of video on the basis of the lists L'1 to L'4. In other words, the flickering-frequency calculation unit 116 calculates the frequency of the flickering portion of video. The flickering-frequency calculation unit 116 sets the calculated frequency to the flickering frequency in the frame information.

The redundant-image deletion processing unit 117 performs a deletion process on a redundant image, deleting the piece of frame information in the list L'3 overlapping with that in the list L'1.

The computing processing unit 118 performs a computing process on the pieces of frame information within each group in the display lists L'1 to L'4. As will be described below, the computing processing unit 118 performs a computing process on the number of groups set in each list, a time length of each group (difference between the first frame time and the last frame time), the number of factor images in the same group (the number of frame information), an error frequency per unit time (1 second) in each group (quotient obtained by dividing the number of factor images in a group by the time length of the group), and the like. Incidentally, the computing processing unit 118 may perform various computing processes on the basis of the frame information registered in the display lists L'1 to L'4 according to the instruction by the user.

The factor-image display unit 119 displays a factor image for each factor on the basis of the frame information stored in the display lists, and also displays the computing result calculated by the computing processing unit 118.

==Processing Outline==

Figure 6:
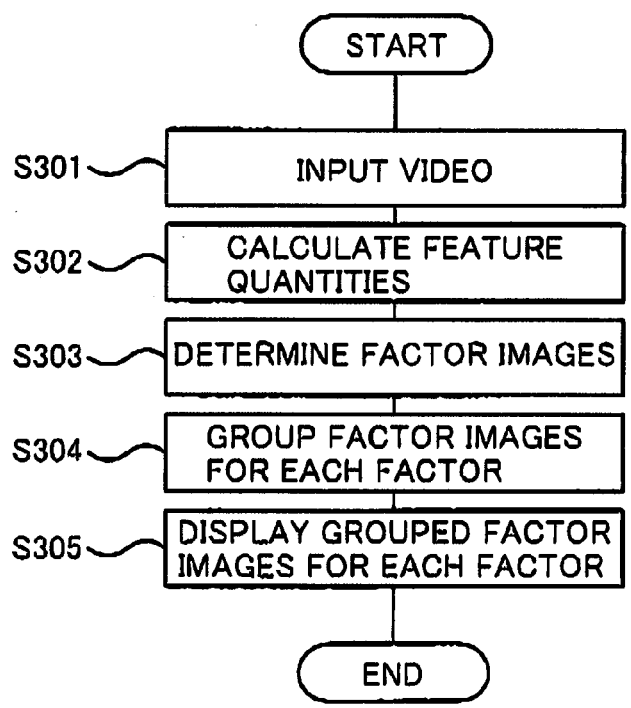
FIG. 6 is a flow chart for illustrating an outline of a process performed by the factor detection apparatus 10.

Hereinafter, description will be given of a process by the factor detection apparatus 10 according to this embodiment. FIG. 6 is a flow chart for illustrating an outline of the process performed by the factor detection apparatus 10. As shown in this chart, the factor detection apparatus 10 receives, from the video input device 25, still-image data on still images constituting a video (S301); calculates the feature quantities 1 to 4 on the basis of the received still-image data (S302); and determines whether or not the still images are factor images on the basis of the calculated feature quantities (S303). The factor detection apparatus 10 groups the determined factor images for each factor (S304), and displays the grouped factor images for each factor (S305). The specific description will be given below.

==Detection Process of Factor Image==

Figure 7:
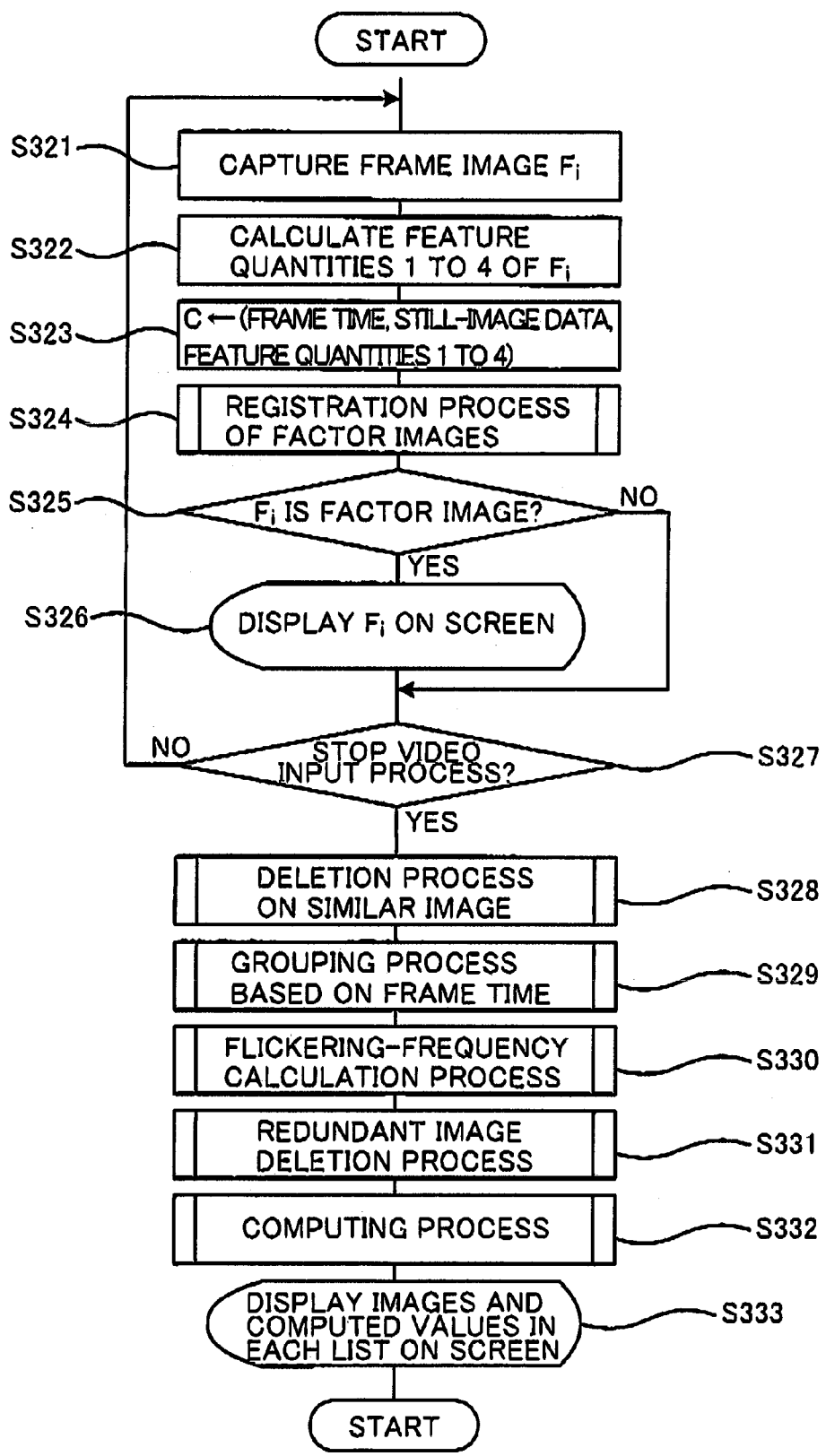
FIG. 7 is a flowchart showing a flow of a detection process of a factor image.

FIG. 7 is a flow chart showing a flow of a detection process of a factor image.

The factor detection apparatus 10 stores, into the memory 102, still-image data on a still image Fi captured by the video input device 25 (S321). The factor detection apparatus 10 calculates the above-described feature quantities 1 to 4 on the basis of the still-image data on Fi thus stored (S322).

Figure 8:
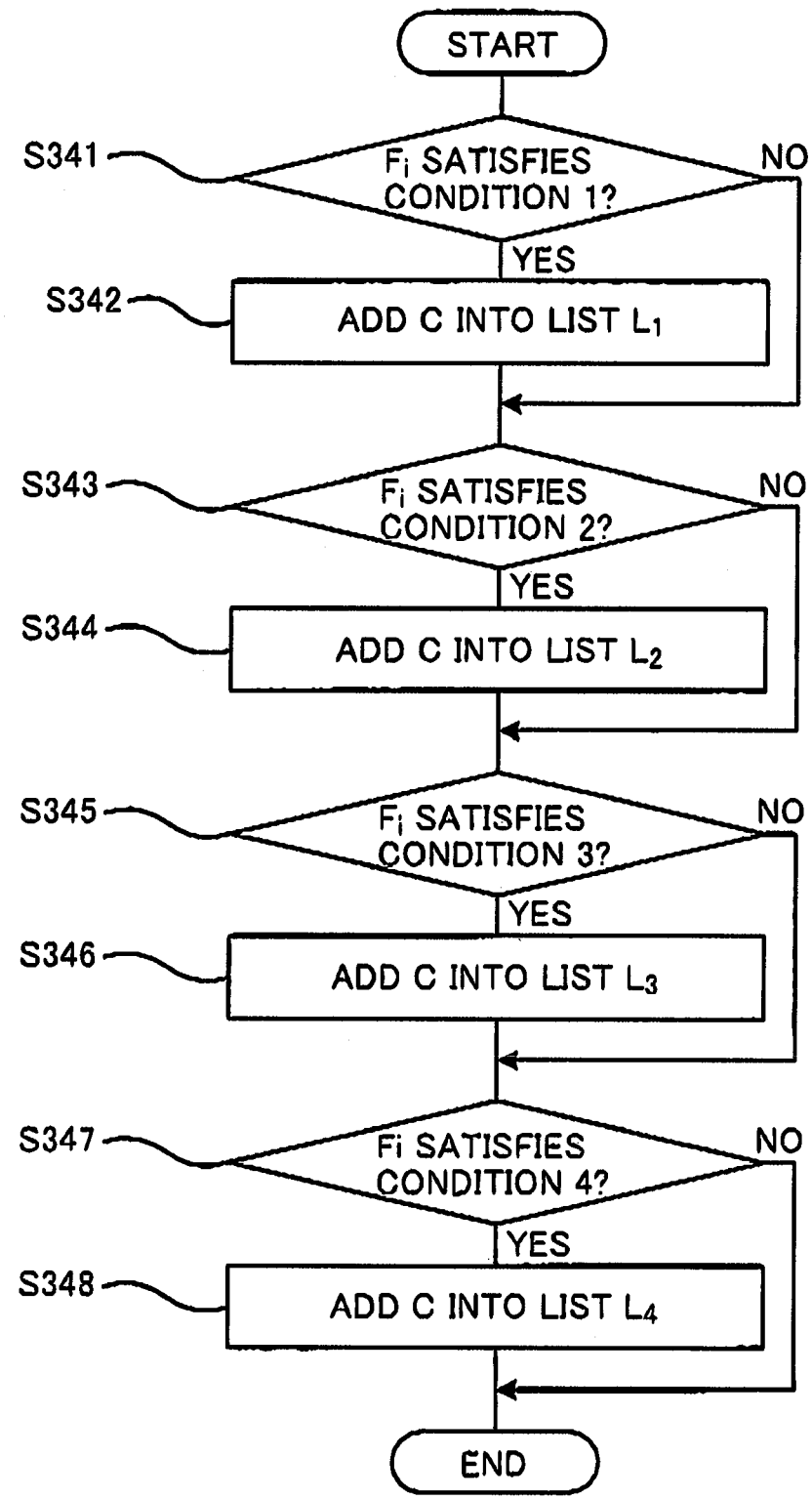
FIG. 8 is a flow chart showing a flow of a registration process of the factor image.

The factor detection apparatus 10 acquires the frame time of Fi, and associates the frame time with the still-image data stored into the memory 102 and the calculated feature quantities 1 to 4, setting as C (S323). Subsequently, the factor detection apparatus 10 performs a registration process on the factor image as shown in FIG. 8 (S324).

When the above-described condition 1 is satisfied (S341: YES), the factor detection apparatus 10 adds C into the list L1 (S342). Then, when the condition 2 is satisfied (S343: YES), the factor detection apparatus 10 adds C into the list L2 (S344). Subsequently, when the condition 3 is satisfied (S345: YES), the factor detection apparatus 10 adds C into the list L3 (S346). Thereafter, when the condition 4 is satisfied (S347: YES), the factor detection apparatus 10 adds C into the list L4 (S348).

On the basis of whether any one of the conditions 1 to 4 is satisfied, the factor detection apparatus 10 determines whether Fi is a factor image (S325). When Fi is the factor image (S325: YES), Fi is displayed on a screen (S326).

The factor detection apparatus 10 determines whether to stop the video input process on the basis of whether the factor detection apparatus 10 receives an instruction to end the process from the user through the input device 23 such as a keyboard and a mouse, or whether the output from the video input device 25 is ended (S327). When determining to continue the video input process (S327: NO), the factor detection apparatus 10 repeats the processes from S321.

==Deletion Process of Similar Image==

Figure 9:
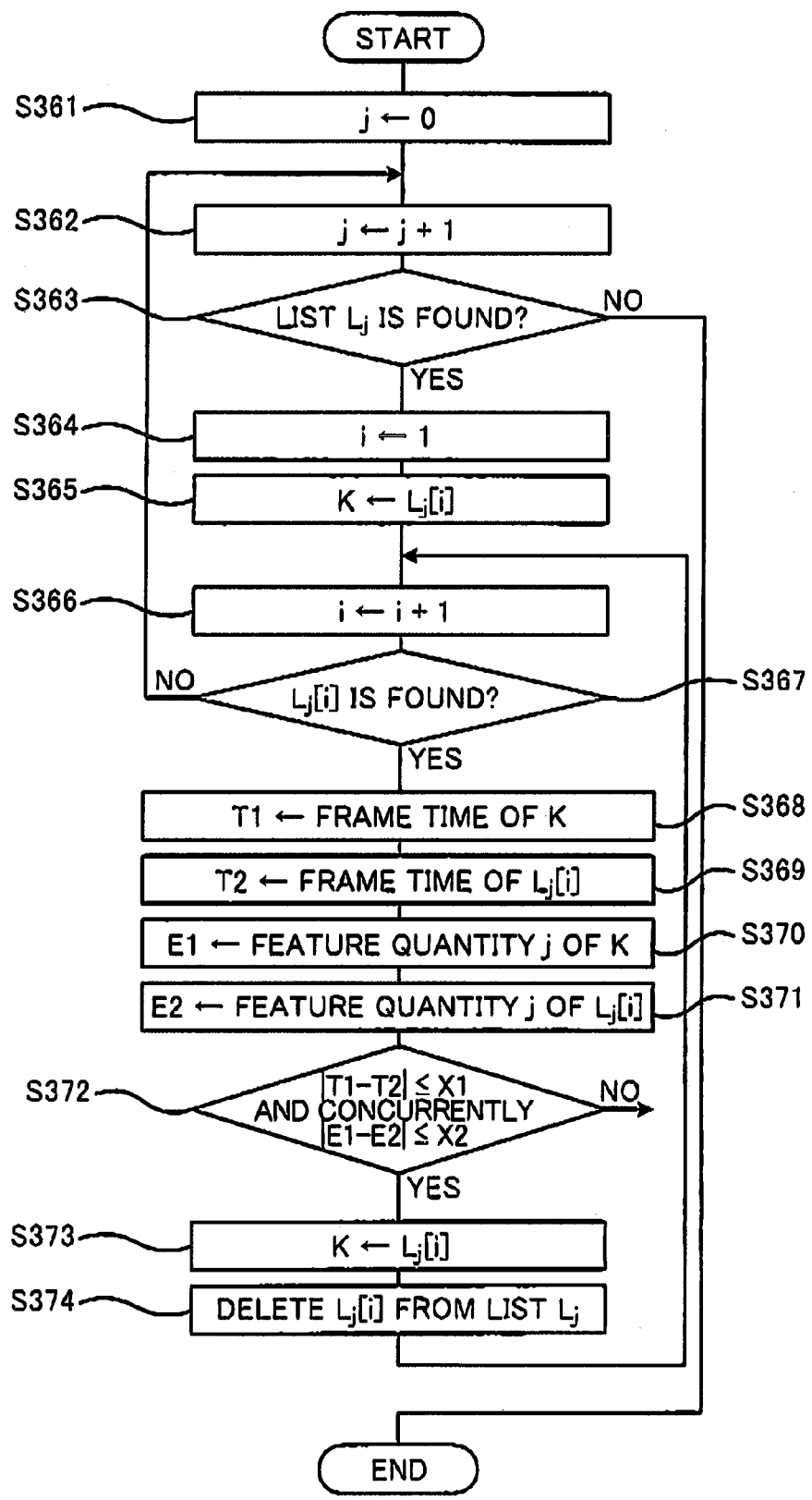
FIG. 9 is a flowchart showing a flow of a deletion process of a similar image.

When determining to stop the video input process (S327: YES), the factor detection apparatus 10 performs a deletion process on the image similar to other images in each list L1 to L4, as shown in FIG. 9 (S328).

The factor detection apparatus 10 sets "0" to j (S361). The factor detection apparatus 10 then increments j (S362). When a list Lj is found, that is, when j is 4 or less (S363: YES), the factor detection apparatus 10 sets "1" to i (S364), and set the i th frame information in the list Lj (Lj[i]) to K (S365). Subsequently, the factor detection apparatus 10 increments i (S366). Thereafter, when the i th frame information in the list Lj (Lj[i]) is not found (S367: NO), the factor detection apparatus 10 repeats the processes from S362.

When Lj[i] is found (S367: YES), the factor detection apparatus 10 sets: the frame time of K to T1 (S368); the frame time of Lj[i] to T2 (S369); the feature quantity j of K to E1 (S370); and the feature quantity j of Lj[i] to E2 (S371). After that, when the absolute value of the difference between T1 and T2 is equal to, or less than, a predetermined threshold X1, and concurrently when the absolute value of the difference between E1 and E2 is equal to, or less than, a predetermined threshold X2 (S372: YES), the factor detection apparatus 10 sets Lj[i] to K (S373), deletes Lj[i] from the list Lj (S374), and repeats the processes from S366.

After the above-described processes are performed on all the lists L1 to L4, the piece of the frame information on the still image which has a frame time approximate to those of the adjacent still images, and concurrently which slightly differs from the adjacent still images in the feature quantities is deleted from the lists. Here, a list of still images is displayed on the basis of the frame information, as described later. Accordingly, by deleting, from the list, the pieces of the frame information on still images similar to a still image, it is possible not to consecutively display the similar still images. This allows the user who manages the factor images to easily grasp a scene producing a factor influencing health.

==Grouping Process of Frame Information==

Figure 10:
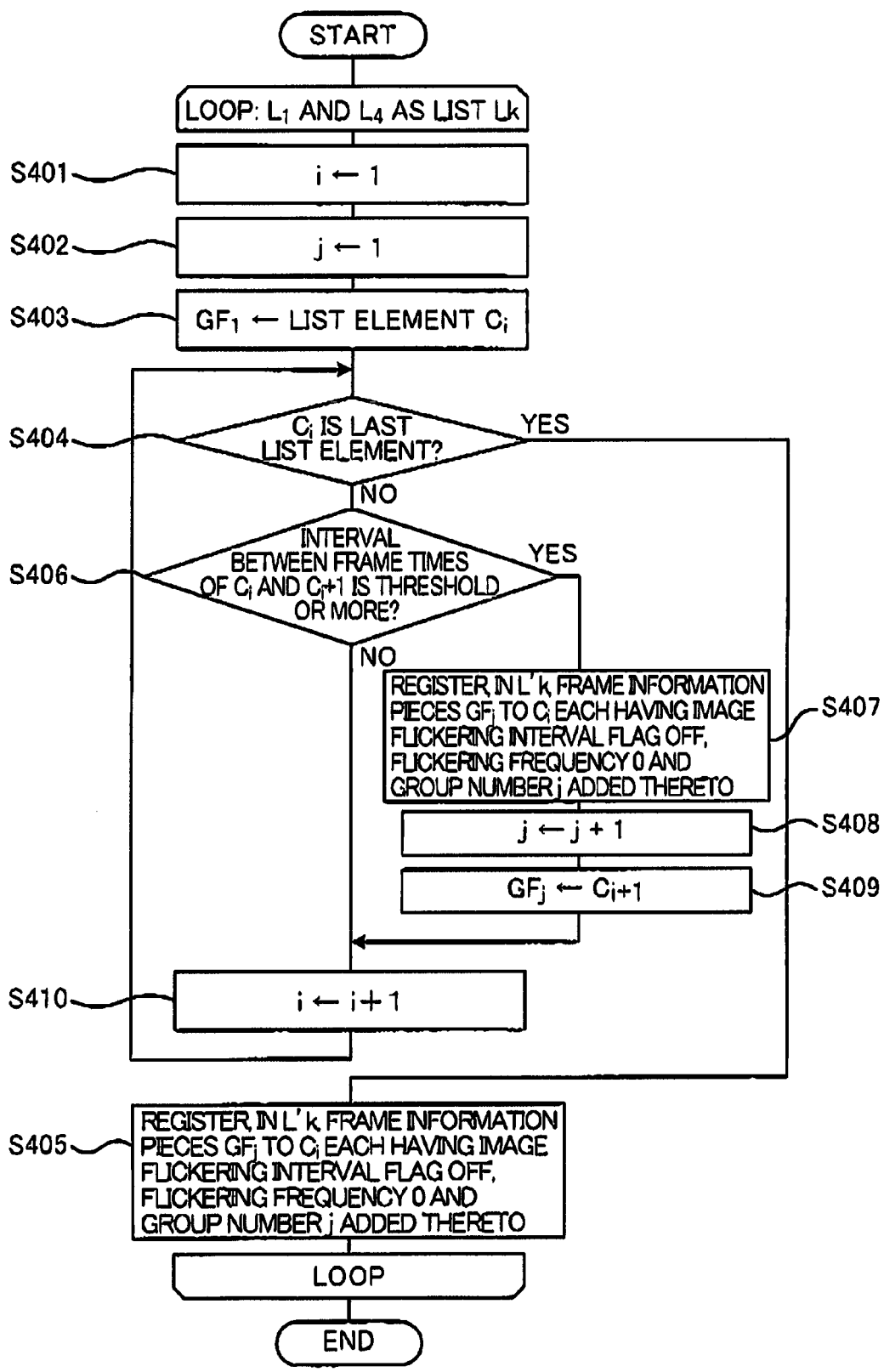
FIG. 10 is a flowchart showing a flow of a grouping process based on a frame time.

Next, the factor detection apparatus 10 performs a grouping process, on the lists L1 and L4, based on a frame time shown in FIG. 10 (S329) to create the display lists L'1 and L'4. Note that, as described above, in the lists L'2 and L'3, registered are the frame information obtained by adding, to every piece of the frame information stored in the respective lists L2 and L3, the image-flickering interval flag "OFF", the flickering frequency "0" and the group number "1".

The factor detection apparatus 10 performs the following processes on lists Lk (k=1, 9).

The factor detection apparatus 10 sets: 1 to a variable (S901); "1" to a variable j (S402); and the i th frame information Ci in the list to GF1 (S403). Then, the factor detection apparatus 10 determines whether or not Ci is the last element in the list (S404). When Ci is the last element in the list, the factor detection apparatus 10 adds, to L'k, the frame information obtained by adding, to each piece of frame information GFj to Ci in the list, the image-flickering interval flag "OFF", the flickering frequency "0" and the group number j (S405).

Meanwhile, suppose a case where Ci is not the last element in the list (S404: NO). In this case, when the interval between the frame time of Ci and the frame time of Ci+1, which is the element following Ci, is equal to, or more than, a predetermined threshold (S406: YES), the factor detection apparatus 10 adds, to L'k, the frame information obtained by adding, to each piece of frame information GFj to Ci in the list, the image-flickering interval flag "OFF", the flickering frequency "0" and the group number j (S407). The factor detection apparatus 10 increments j (S408), and then sets Ci+1 to GFj (S409).

The factor detection apparatus 10 increments i, and repeats the processes from S404.

Thereby, the still images which have frame times approximate to one another are grouped in the lists L'1 and L' 4.

==Calculation Process for Flickering Frequency==

Figure 11:
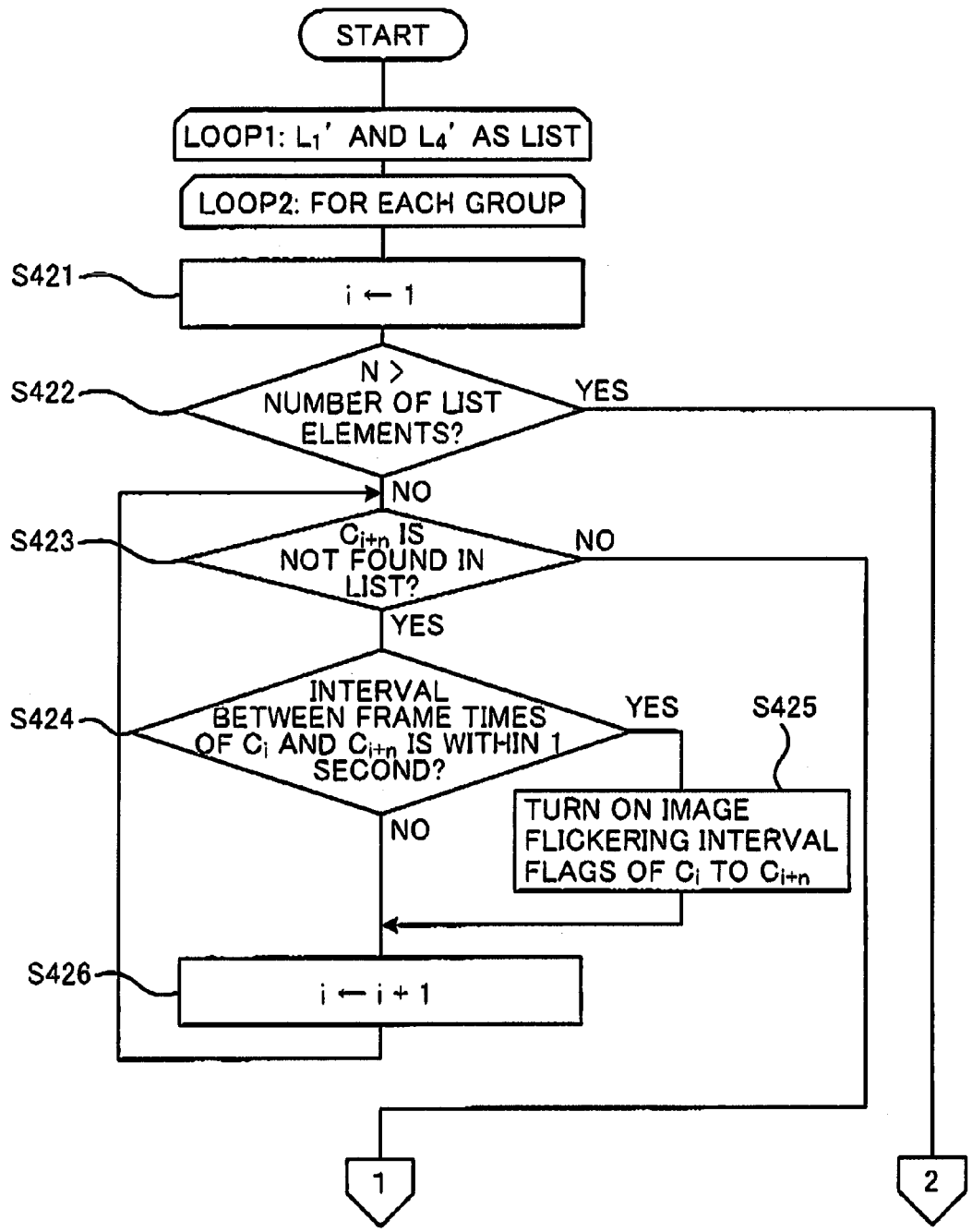
FIG. 11 is a flow chart showing a flow of a calculation process for the flicker frequency.
Figure 12:
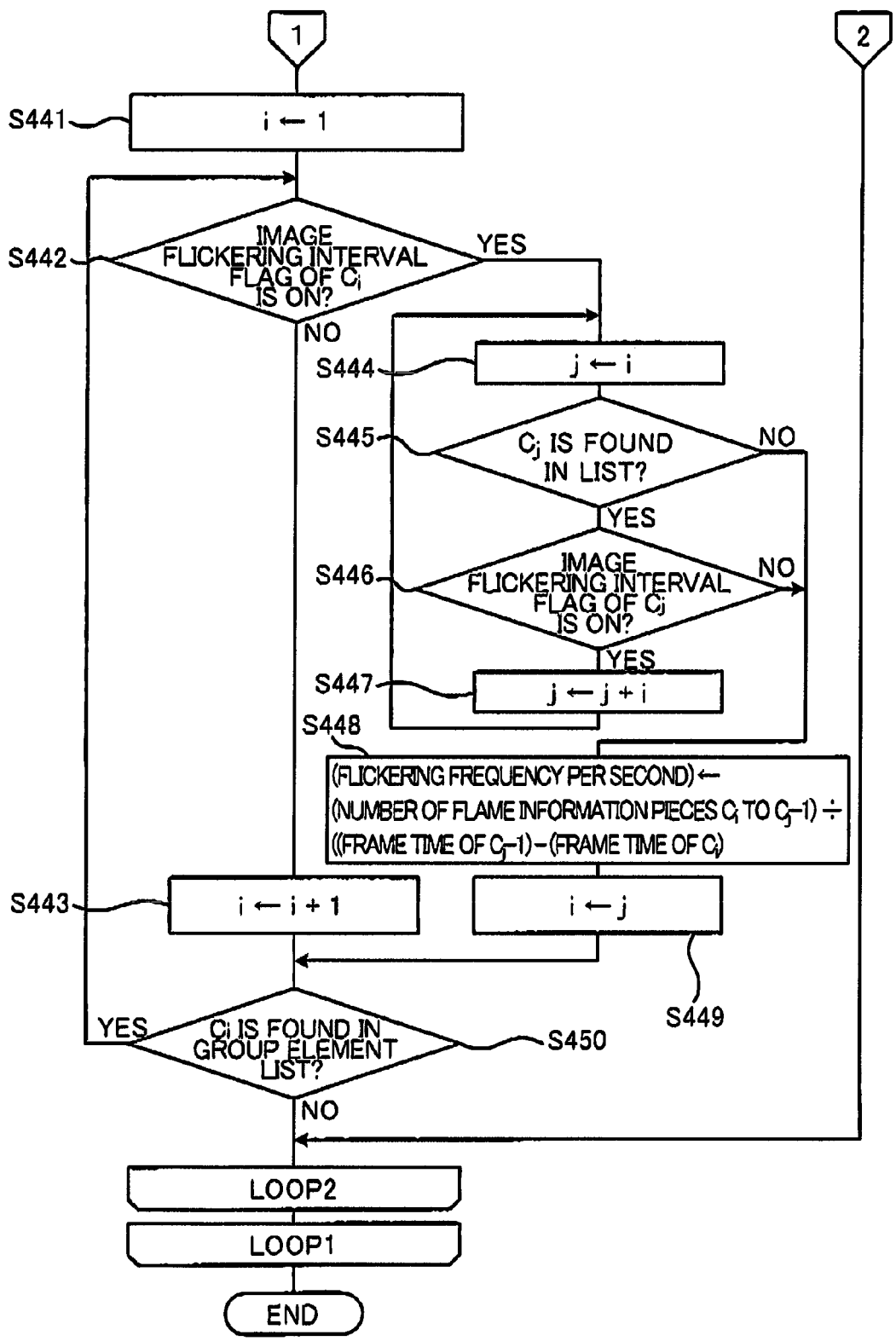
FIG. 12 is another flow chart showing a flow of the calculation process for the flicker frequency.

After the display lists L'1 to L'4 are created as described above, the factor detection apparatus 10 performs a calculation process for flickering frequency in the lists L'1 and L'4 (S330). Each of FIG. 11 and FIG. 12 shows a flow of the calculation process for the flickering frequency. The factor detection apparatus 10 performs the following processes on each of the lists L'1 and L' as well as each group in each of the lists L'1 and L' 4.

The factor detection apparatus 10 sets 1 to a variable (S421), and determines whether or not the number of frame information included in the list is equal to, or more than, a threshold value n which is set in advance (S422). Suppose a case where the number of frame information is more than n (S922: NO). In this case, when the i+n th frame information Ci+n is found in the list (S423: YES), and then when the interval between the frame time of the i th frame information Ci and the frame time of Ci+n is within 1 second (S929: YES), the factor detection apparatus 10 sets, to "ON", the image-flickering interval flags of the frame information Ci to Ci+n (S925). The factor detection apparatus 10 increments i, and repeats the processes from S423.

The factor detection apparatus 10 sets 1 to i (S441). Subsequently, when the image-flickering interval flag of the i th frame information Ci in the list is not "ON" (S442: NO), the factor detection apparatus 10 increments i (S443). Meanwhile, when the image-flickering interval flag of Ci is "ON" (S442: YES), the factor detection apparatus 10 sets i to a variable j (S444). Thereafter, when the j th frame information Cj is found in the list (S445: YES), and then when the image-flickering interval flag of Cj is "ON" (S446: YES), the factor detection apparatus 10 increments j (S447).

On the other hand, when Cj is not found in the list (S445: YES), or when the image-flickering interval flag of Cj is not "ON" (S446), the factor detection apparatus 10 calculates, as the flickering frequency per second, the quotient obtained by dividing the number of frame information Ci to Cj−1 by the time obtained by subtracting the frame time of the i th frame information Ci from the frame time of the j−1 th frame information Cj−1. After that, the factor detection apparatus 10 sets the calculated flickering frequency to the frame information Ci to Cj−1 (S448), and then sets j to i (S499).

When the i th frame information Ci is found in the list (S450: YES), the factor detection apparatus 10 repeats the processes from S442. Meanwhile, when Ci is not found in the list, the factor detection apparatus 10 repeats the processes from S421 in FIG. 11 for the next group or list.

Thereby, the frequency of flickering video is calculated. Furthermore, since, through the above-described processes, the image-flickering interval flag of the frame information on a still image which exists within the flickering duration is set to "ON", the user is allowed to easily specify the still image which causes the flicker.

==Deletion Process of Redundant Image==

Figure 13:
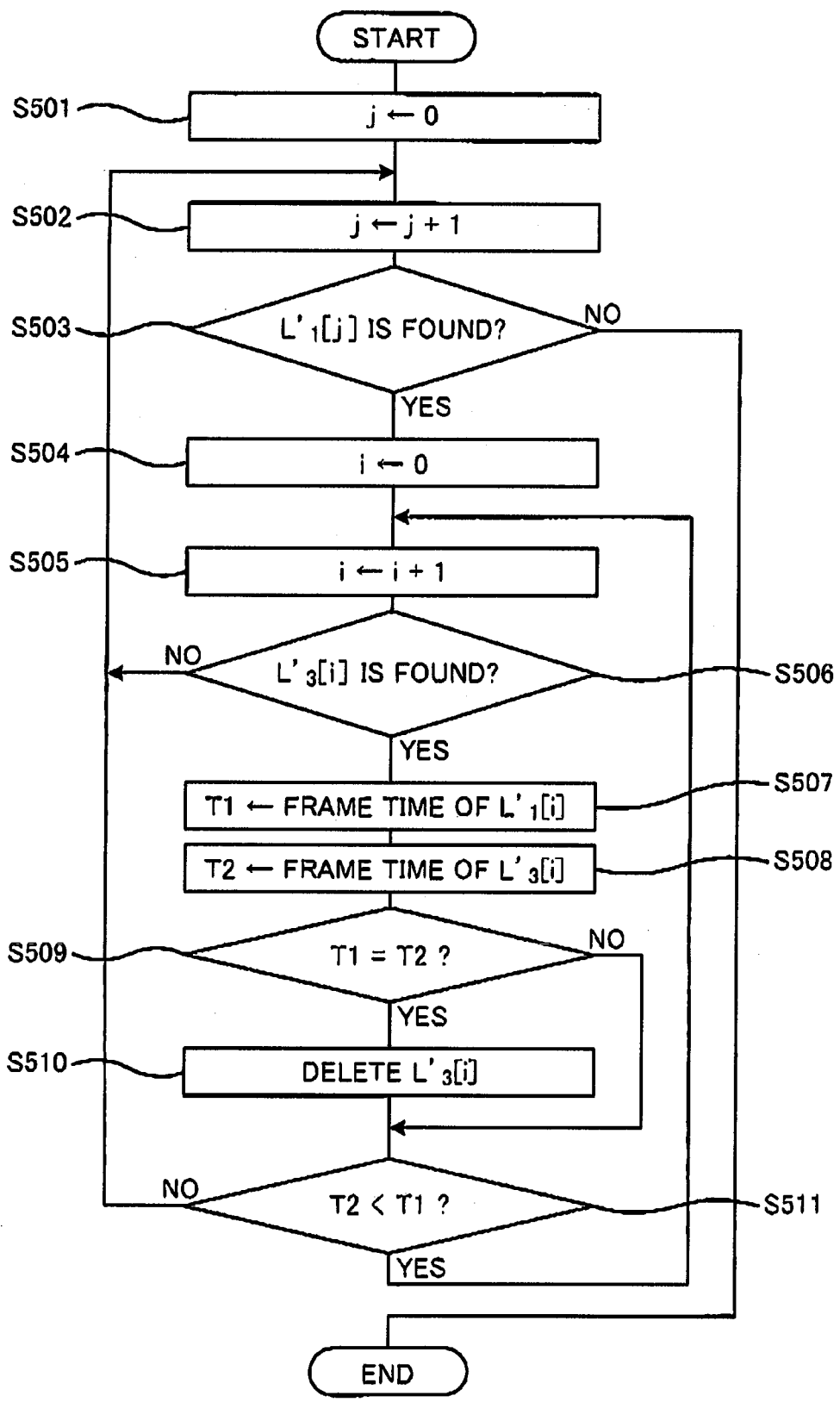
FIG. 13 is a flow chart showing a flow of a deletion process of a redundant image.

Next, the factor detection apparatus 10 performs a deletion process on a redundant image in the list L3, deleting the frame information overlapping with that in the list L1 (S331). FIG. 13 shows a flow of the deletion process of the redundant image.

The factor detection apparatus 10 sets 0 to a variable j (S501).

The factor detection apparatus 10 increments j (S502). Then, when the j th frame information in the list L'1 (L'1[j]) is found (S503: YES), the factor detection apparatus 10 sets 0 to a variable i (S504).

Subsequently, the factor detection apparatus 10 increments (S505). Thereafter, when the i th frame information in the list L'3 (L'3[i]) is not found (S506: NO), the factor detection apparatus 10 repeats the processes from S502. Meanwhile, when L'3[i] is found (S506: YES), the factor detection apparatus 10 sets the frame time of L'1(i) to T1 (S507), and the frame time of L'3[i] to T2 (S508). After that, when T1 is equal to T2 (S509: YES), L'3[i] is deleted from L'3 (S510). When T2 is shorter than T1 (S511: YES), the factor detection apparatus 10 repeats the processes from S505. Meanwhile, T1 is shorter than T2 (S511: NO), the factor detection apparatus 10 repeats the processes from S502.

The above-described processes are repeated until L'1[j] is no longer found. Thereby, those pieces of the frame information in L'3 that each have the same frame time as any piece of the frame information registered in L'1, are deleted. As a result, even when a still image registered in L'1 as the flickering factor has a regularly patterned design, the still image is not displayed redundantly in L'3. Thus, it is possible to prevent a still image to be edited from being displayed as having multiple factors, thereby to reduce the number of images to be displayed. This allows the user to easily review the displayed images visually, and to easily grasp a part in the video which needs to be edited.

==Computing Process==

Figure 14:
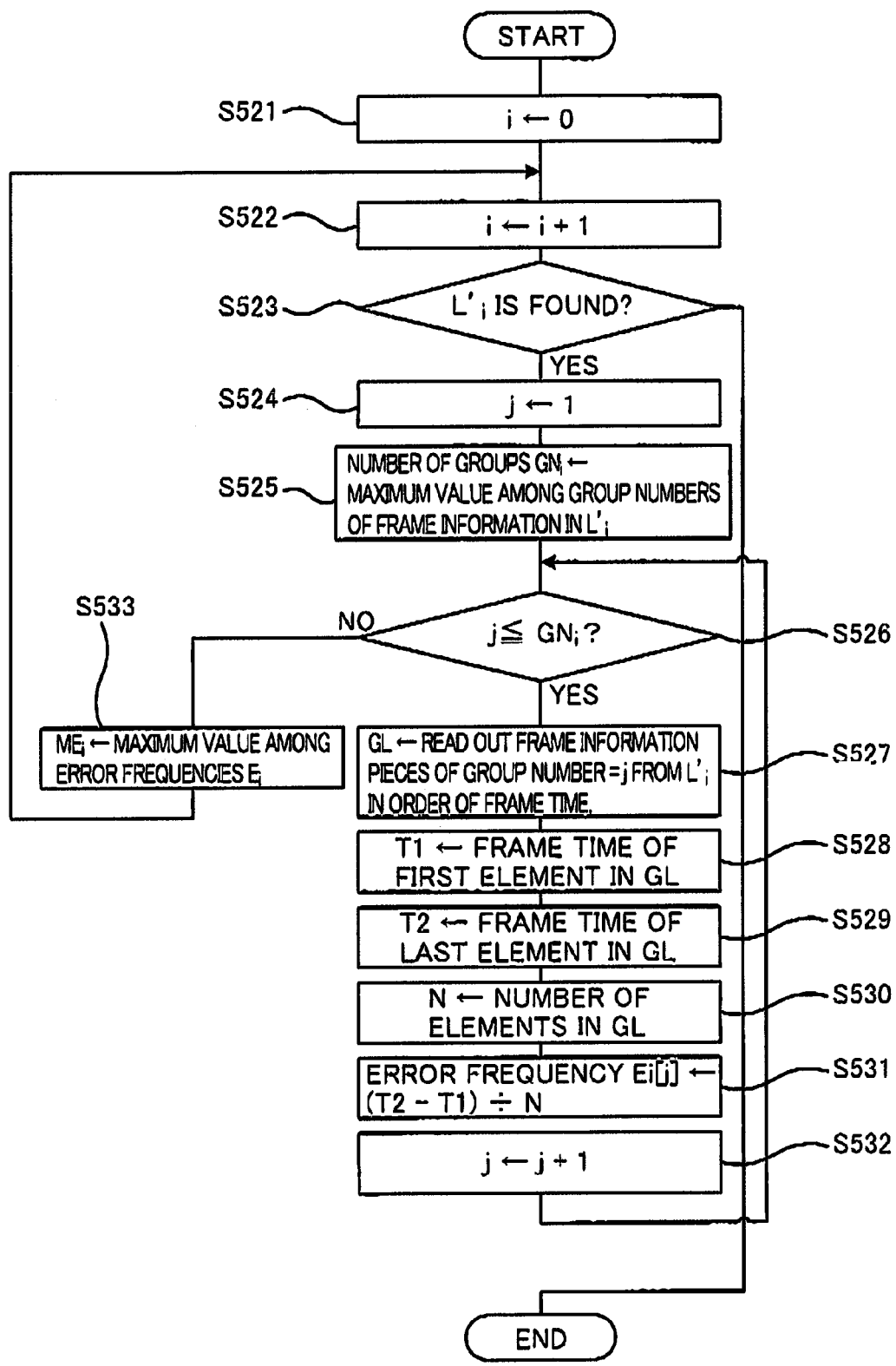
FIG. 14 is a flow chart showing a flow of a computing process.

Next, the factor detection apparatus 10 performs a computing process on the pieces of frame information within each group in the display lists L'1 to L'4 (S332). FIG. 14 shows a flow of the computing process.

The factor detection apparatus 10 sets 1 to a variable (S521). The factor detection apparatus 10 increments i (S522), and then, when L'i is not found, that is, when i becomes equal to 5 (S523: NO), the factor detection apparatus 10 ends the computing process.

Meanwhile, when L' i is found (S523: YES), the factor detection apparatus 10 sets 1 to a variable j (S529), and computes the pieces of frame information in the display list L' i to obtain the maximum value among the group numbers, setting the obtained maximum value to the number of groups GNi of the list L' i (S525).

When j is equal to, or less than, GNi (S526: YES), the factor detection apparatus 10 reads out the pieces of frame information which have the group number corresponding to that of j from L'i in order of each frame time. Then, the factor detection apparatus 10 sets the pieces of frame information to GL (S527). The factor detection apparatus 10 sets, to T1, the frame time of the first frame information in GL (S528), and sets, to T2, the frame time of the last frame information in GL (S529). Subsequently, the factor detection apparatus 10 sets, to N, the number of frame information in GL (S530), and sets, to an error frequency Ei[j] for the group j in the list L' i, the quotient obtained by dividing the difference subtracting T1 from T2 by N (S531). Thereafter, the factor detection apparatus 10 increments j (8532), and performs the processes from S526.

In the meantime, when j exceeds GNi (S526: NO), the factor detection apparatus 10 calculates the maximum value of the error frequency Ei, setting as MEi (S533), and repeats the processes from S522.

Thereby, obtained are the computed values such as the error frequency of each group in the display lists L'1 to L'4 and the maximum error frequency in each list. Incidentally, although the above-described computed values are based on the error frequency, the factor detection apparatus 10 may calculate various computed values based on the frame information in the display lists L'1 to L'4. For example, the computed value may be the number of factor images.

==Display Process==

Figure 15:
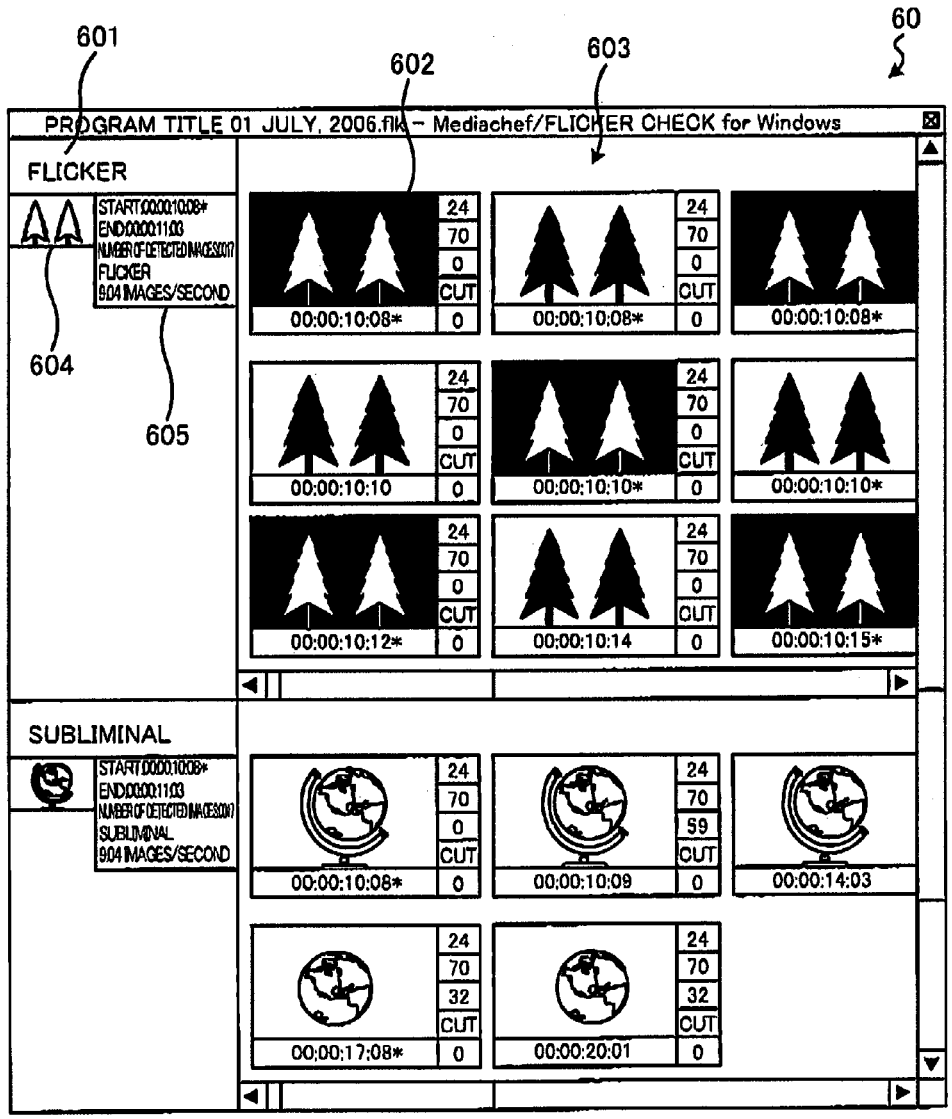
FIG. 15 shows one example of a screen 60.

After the above processes are performed, the factor detection apparatus 10 displays the factor images based on the frame information registered in the display lists L'1 to L'4 and the computed values on a screen (S333). FIG. 15 shows one example of a screen 60 displayed by the factor detection apparatus 10. The screen 60 includes, for each of the four factors, a display section 601 for describing the factor, a display section 603 for factor images 602, a display section 604 for the representative image of the factor images 602, and a display section 605 for the information on the list. In the example shown in FIG. 15, lists of the factor images 602 are displayed for the factors of "flicker" and "subliminal" (respectively corresponding to the display lists L'1 and L'3).

The factor images 602 are displayed on the basis of the still-image data in the frame information. The representative image displayed on the display section 604 is displayed on the basis of the still-image data in the frame information registered at the top of the display list. The display section 605 displays the frame time of the frame information at the top of the display list (start), the frame time of the frame information at the bottom of the display list (end), the number of frame information in the display list (the number of detected images), the description of the factor, the average number of factor images per second, and the like. The average number of factor images per second can be calculated as, for example, the quotient obtained by dividing the number of "detected images" by the time between the above-described "start" time and "end" time.

Figure 16:
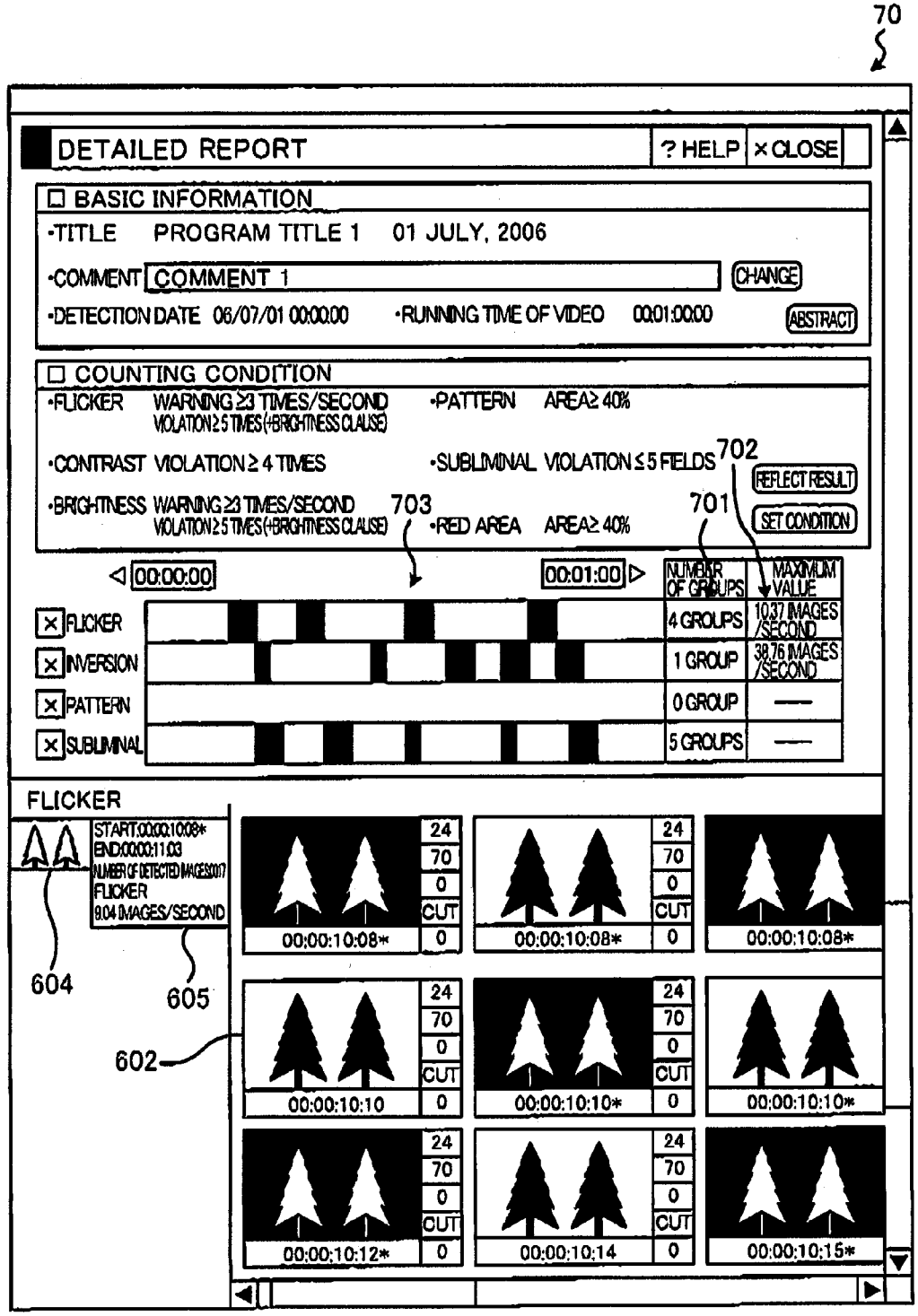
FIG. 16 shows one example of a screen 70.

When the representative image 604 on the screen 60 is clicked by a mouse or the like, a screen 70 shown in FIG. 16 is displayed. The upper section of the screen 70 displays for example computed values calculated on the basis of the frame information in the display lists L'1 to L'4. A display section 701 on the screen 70 displays the number of groups in the display list for each factor described above. A display section 702 on the screen 70 displays the maximum value MEi of the error frequency.

Moreover, the lower section of the screen 70 displays the list of the factor images 602 for a factor as in the case of the screen 60.

As has been described, the factor detection apparatus 10 according to this embodiment is capable of determining whether or not a still image produces factors influencing health on the basis of the corresponding feature quantities of the still image, and of displaying the thus determined still images for each factor. Here, the factor includes a flicker of screen, a display of a regularly patterned design, a display of a subliminal video, and an inversion of contrast. This allows a user to easily grasp what factor the displayed image produces.

Moreover, when the editing is performed on the video to eliminate the factors influencing health therefrom, the user who edits can easily grasp what image to edit and from what point of view. Thereby, the operation time for the editing is reduced. Furthermore, since the user who edits become capable of grasping the factor influencing health, the user makes an accurate determination of how to edit the video. Therefore, an appropriate editing is performed.

Additionally, the factor detection apparatus 10 according to this embodiment groups the consecutive factor images similar to one another into one within a list for each factor. Thereby, the multiple images similar to one another are not displayed at once, and this allows the user to easily grasp what still image produces the factor in a convenient manner. Moreover, by reducing the number of images to be displayed, the error that the user overlooks the factor images is less likely to occur. Furthermore, when the video is edited, the user who edits can easily grasp the scene to be edited. Therefore, the operation efficiency for the editing is increased.

Moreover, the factor detection apparatus 10 according to this embodiment deletes the factor image registered in the list L1 for the flicker from the list L3 for the display of a subliminal video. Thereby, the single factor image which has the multiple factors is not displayed for each of the multiple factors, and the user easily grasps the factor image to be edited. Thus, when the video is edited, it is possible to prevent the error to give multiple instructions to edit on the single scene.

Note that, in this embodiment, the factor image is detected only for any one of the above-described four factors influencing health. However, the present invention is not limited to this, and factor images may be detected for other factors. In this case, the factor images which produce the other factors may be determined by using other conditions, in addition to the four conditions 1 to 4 described above, to determine the factor images on the basis of the feature quantities thereof.

In addition, in this embodiment, the four feature quantities 1 to 4 are calculated as described above. However, the present invention is not limited to this, and various feature quantities may be calculated. Then, factor images may be determined by using the feature quantities other than the above-described feature quantities 1 to 4 in the conditions 1 to 4.

Moreover, in this embodiment, the still-image data to be read is outputted from the video input device 25. However, for example, the factor detection apparatus 10 may have a function of the video input device 25 which converts the analog video signal to still-image data. Alternatively, the factor detection apparatus 10 may read encoded moving-image data stored in a recording medium such as a DVD-ROM, CD-ROM, hard disk and flash memory.

Furthermore, in this embodiment, the redundant-image deletion processing unit 117 performs the deletion process on a redundant image in only L'3. However, the deletion process may also be performed on a redundant image in the other display lists. Alternatively, priorities may be set among the factors. In this case, when each display list stores the identical frame information on a frame time, the redundant-image deletion processing unit 117 deletes the frame information from a first list which has a lower priority than that of a second list. Thereby, a factor image having a more important factor is displayed.

Although description has been given of the present embodiment, it should be understood that the embodiment is to facilitate the understanding of the present invention, but not to limit the scope of the present invention. Various changes and alternations can be made without departing from spirit and scope of the present invention, and the present invention includes equivalents thereof.

What is claimed is:

1. An information processor which detects factors, in a video, influencing health, comprising:
    an image input unit which receives a series of image data to process a plurality of consecutive still images constituting the video;
    a feature-quantity calculation unit which calculates a feature quantity of each of the still images on the basis of the image data;
    a conditional-expression storing unit which stores a conditional expression, for each factor, to determine whether each of the still images produces the factor on the basis of the corresponding feature quantity;
    a factor determination unit which determines, for each factor, whether each of the still images produces the factor on the basis of the corresponding feature quantity and the corresponding conditional expression;
    an image-list display unit which displays, for each factor, a list of information indicating the still images determined to produce the factor;
    an image-storing unit which stores the series of image data received by the image input unit, wherein
    the feature quantity is divided feature information obtained by using feature quantities of divided images, the divided images obtained by dividing each of the still images in a grid-form, and
    the conditional expression is to determine whether the number of particular divided images among the divided images exceeds a predetermined threshold, the particular divided images each having the divided feature information that has a difference from that of the corresponding divided image of each of the consecutive still images, the difference exceeding a predetermined threshold.

2. An information processor which detects factors, in a video, influencing health, comprising:
    an image input unit which receives a series of image data to process a plurality of consecutive still images constituting the video;
    a feature-quantity calculation unit which calculates a feature quantity of each of the still images on the basis of the image data
    a conditional-expression storing unit which stores a conditional expression, for each factor, to determine whether each of the still images produces the factor on the basis of the corresponding feature quantity;
    a factor determination unit which determines, for each factor, whether each of the still images produces the factor on the basis of the corresponding feature quantity and the corresponding conditional expression;
    an image-list display unit which displays, for each factor, a list of information indicating the still images determined to produce the factor;
    a list-storing unit which stores the list of information, for each factor, indicating the still images determined to produce the factor; and
    a list-adjustment unit which deletes, from the list for each factor, each piece of the information indicating the still images in the list, in a case where a difference between the feature quantity of the still image indicated by the piece of the information and that indicated by a certain piece of the information is equal to or less than a predetermined threshold, the certain piece of the information preceding the piece of the information by a predetermined number of pieces of information, wherein
    the image-list display unit displays, for each factor, the list of information indicating the still images in the list for the factor.

3. An information processor which detects factors, in a video, influencing health, comprising:
    an image input unit which receives a series of image data to process a plurality of consecutive still images constituting the video;
    a feature-quantity calculation unit which calculates a feature quantity of each of the still images on the basis of the image data;
    a conditional-expression storing unit which stores a conditional expression, for each factor, to determine whether each of the still images produces the factor on the basis of the corresponding feature quantity;
    a factor determination unit which determines, for each factor, whether each of the still images produces the factor on the basis of the corresponding feature quantity and the corresponding conditional expression;
    an image-list display unit which displays, for each factor, a list of information indicating the still images determined to produce the factor;
    a list-storing unit which stores a list of information, for each factor, indicating the still images determined to produce the factor; and
    a list-adjustment unit which deletes, from the list for each factor, each piece of the information indicating the still images in the list, in a case where the piece of the information is also included in the list for one of the other factors, wherein
    the image-list display unit displays, for each factor, a list of information indicating the still images in the list for the factor.

4. The information processor according to claim 3, further comprising
    a priority-storing unit which stores a priority for each of the factors, wherein
    the list-adjustment unit which deletes, from the list for each factor, each piece of the information indicating the still images in the list, in a case where the piece of the information is also included in the list for any one of the other factors that has the higher priority than the factor.

5. The information processor according to claim 3, further comprising
    an image-storing unit which stores the image data while associating the image data with a time elapsed after the video starts being displayed; wherein the list-adjustment unit deletes, each piece of the information indicating the still images in the list, when the absolute value of a difference between the elapsed times pieces of the adjacent still images is equal to or less than a predetermined threshold, and concurrently when the absolute value of a difference between the feature quantities of the adjacent still images is equal to or less than another predetermined threshold.

* * * * *